Dec. 30, 1969  H. F. RIETH  3,487,398
POWER GENERATOR
Filed Oct. 4, 1965  3 Sheets-Sheet 1
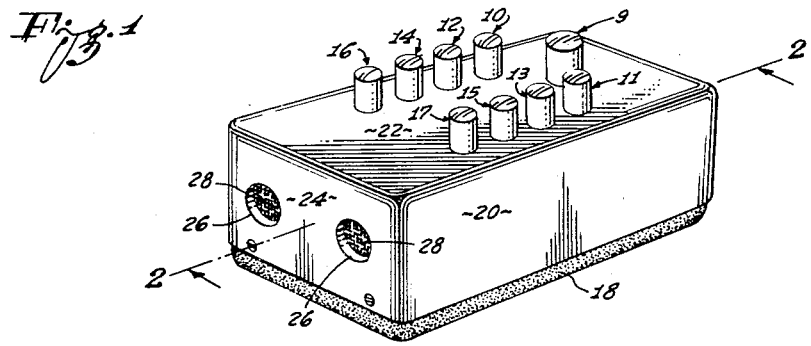
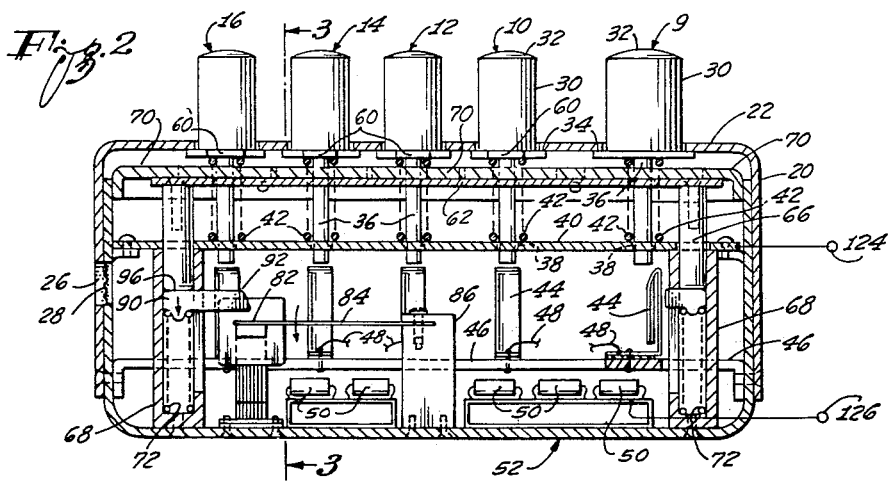
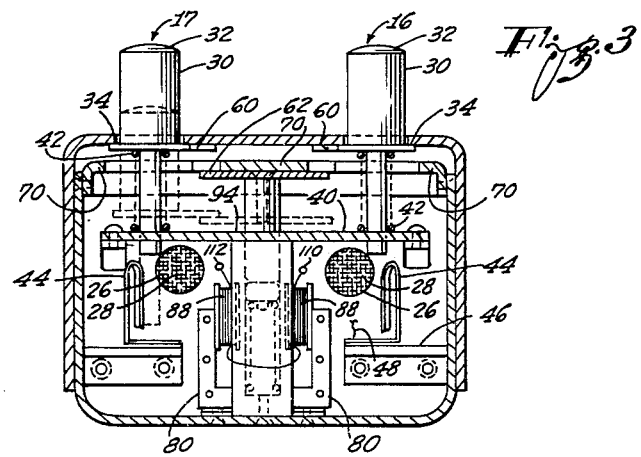
INVENTOR:
Harold F. Rieth
By Smyth, Roston & Pavitt
Attorneys Dec. 30, 1969     H. F. RIETH     3,487,398

POWER GENERATOR

Filed Oct. 4, 1965     3 Sheets-Sheet 2

INVENTOR:
Harold F. Rieth

Attorneys

Dec. 30, 1969  H. F. RIETH  3,487,398
POWER GENERATOR
Filed Oct. 4, 1965  3 Sheets—Sheet 3

INVENTOR:
Harold F. Rieth
By Smyth, Roston & Pavitt
Attorneys

United States Patent Office 3,487,398
Patented Dec. 30, 1969

3,487,398
POWER GENERATOR
Harold F. Rieth, Santa Monica, Calif., assignor to Packard-Bell Electronics Corporation, Los Angeles, Calif., a corporation of California
Filed Oct. 4, 1965, Ser. No. 492,568
Int. Cl. H03b 5/00, 1/00
U.S. Cl. 340—345          9 Claims

ABSTRACT OF THE DISCLOSURE

This invention relates to a system for converting mechanical energy into radio frequency signals. The invention includes a plurality of impedances which are adapted to be connected individually into a circuit to control the frequency at which signals are produced by the circuit. The impedances are individually selected by the actuation of a mechanical member which operates on a power generator to cause the power generator to produce oscillatory signals for introduction to the radio frequency circuit. The power generator may include a magnetic circuit having an air gap, a magnetic member in the air gap and a coil disposed in the magnetic circuit. The magnetic member may be carried by a leaf spring which is actuated by the mechanical member to provide an oscillatory movement of the magnetic member in the air gap.

---

Various embodiments of the invention are provided. In one embodiment, a plurality of mechanical members are provided and each is individually actuated to select a different one of the impedances in the plurality. In another embodiment, a single mechanical member is provided. The mechanical member is rotated to select individual ones of the impedances in the plurality and is moved axially to obtain the production of the oscillatory signals.

This invention relates in general to means for generating electrical power and, more particularly, to improvements upon the power generator disclosed in copending application, Ser. No. 337,582, filed Jan. 14, 1964, on behalf of Harold F. Rieth, inventor.

The above-cited application, Ser. No. 337,582, featured principles for the elimination of batteries in electrical equipment wherein only short bursts of energy are required. Battery-powered equipment has never been fully satisfactory and thus has had lessened sales value because of the limited power delivery capabilities and short life of the average dry cell. Moreover, in many small electrical devices the batteries are the main source of weight and size.

The need for frequent replacement of batteries is not only annoying at the consumer level, but also provides difficulties at the supplier level because a battery will deteriorate at a certain rate even before it is sold and placed into an electrical circuit. Thus battery inventories may degenerate if not sold or turned over quickly, yet rapid turnover may necessitate buying the batteries in uneconomically small lots. The result is that in the television remote control field a batteryless remote control system has been felt to have great sales potential, not only for itself, but also for the entire television set system with which it is associated.

In the above-cited application, Ser. No. 337,582, the usual need for batteries was avoided by the use of a manually-actuated power generator. This power generator included a magnetic circuit having a first core member and a second core member. The first core member was permanently magnetized and had an air gap into which the second core member was able to fit with a minimum clearance on either side. The second core member was then mounted on a spring in such a position that it would pass through this air gap if oscillatory motion was somehow initiated in the spring. The preferred method of converting hand power into oscillatory motion of the spring disclosed in the above-cited application was to have the spring mounted in cantilever form and to deflect the free end of the spring with some hand-rotatable pointed device, of which a ratchet wheel would be a good example. It is the purpose of the instant invention to extend this power generation principle of application, Ser. No. 337,582, to apply it to a radio wave transmitter-generator such as is found in the television remote control field wherein a half dozen or more different frequencies of burst are transmitted in order to improve the capabilities of the remote controller beyond that of mere step-switch performance.

Another general object of the invention is to provide such a variable frequency remote controller wherein maximal ease of use and convenience are achieved, in order to enhance the salability of the controller and of the television set with which it is associated.

In the achievement of the above and other objects and as a feature of applicant's invention, there is provided a remote control type of radio transmitter wherein a single manual act, such as depressing a button, can serve not only to switch a certain desired impedance, such as a resistor, capacitor or inductor, into the time-constant circuitry of the oscillator which generates the radio waves, but also deflects the power generator spring to cause the second core member to oscillate through the first core member and thereby to supply power to the radio signal (RF) oscillator.

As another feature of the invention, the above-disclosed simultaneous frequency selection and power generation can be achieved by providing a bank of buttons, levers or other manually actuatable elements, each of which corresponds to a different frequency. The actuation of any single one of these elements then causes a deflection force to be applied at the end of the power generator spring, while simultaneously an impedance device corresponding to the desired frequency is switched into the time-constant circuitry of the RF oscillator.

As another feature of the invention, the above-mentioned power generation and selection functions may be performed using one knob, by the provision of mechanical linkages whereby rotating the knob performs the selection function and depressing the knob performs the generation function. A preferred embodiment of this principle would have a control shaft which is both rotatable and depressible, a knob mounted on the shaft, a wafer mounted on the shaft to rotate therewith (or, in the alternative, mounted coaxial with the shaft), and an arrangement of electrical contacts whereby rotation of the wafer will cause different impedances to be thrown into circuit with the RF oscillator. The use of this preferred embodiment would be that the shaft would be rotated to switch in the proper impedance and then depressed to oscillate the power generation spring.

As a subsidiary feature of applicant's invention the knob on the control shaft is so shaped as to give an indication of the degree of rotation of the control shaft, so that the rotatable shaft versions of television remote controllers built in accordance with the principles of instant invention will be usable regardless of room darkness.

Other objects and features of the instant invention and a better understanding thereof may be had by referring to the following description and claims taken in conjunction with the accompanying drawings in which:

FIGURE 1 is a perspective view of a television remote controller built according to the principles of the instant invention;

FIGURE 2 is a side elevation in cutaway of the remote controller of FIGURE 1;

FIGURE 3 is a front elevation in cutaway of the remote controller of FIGURE 1;

Figure 4:
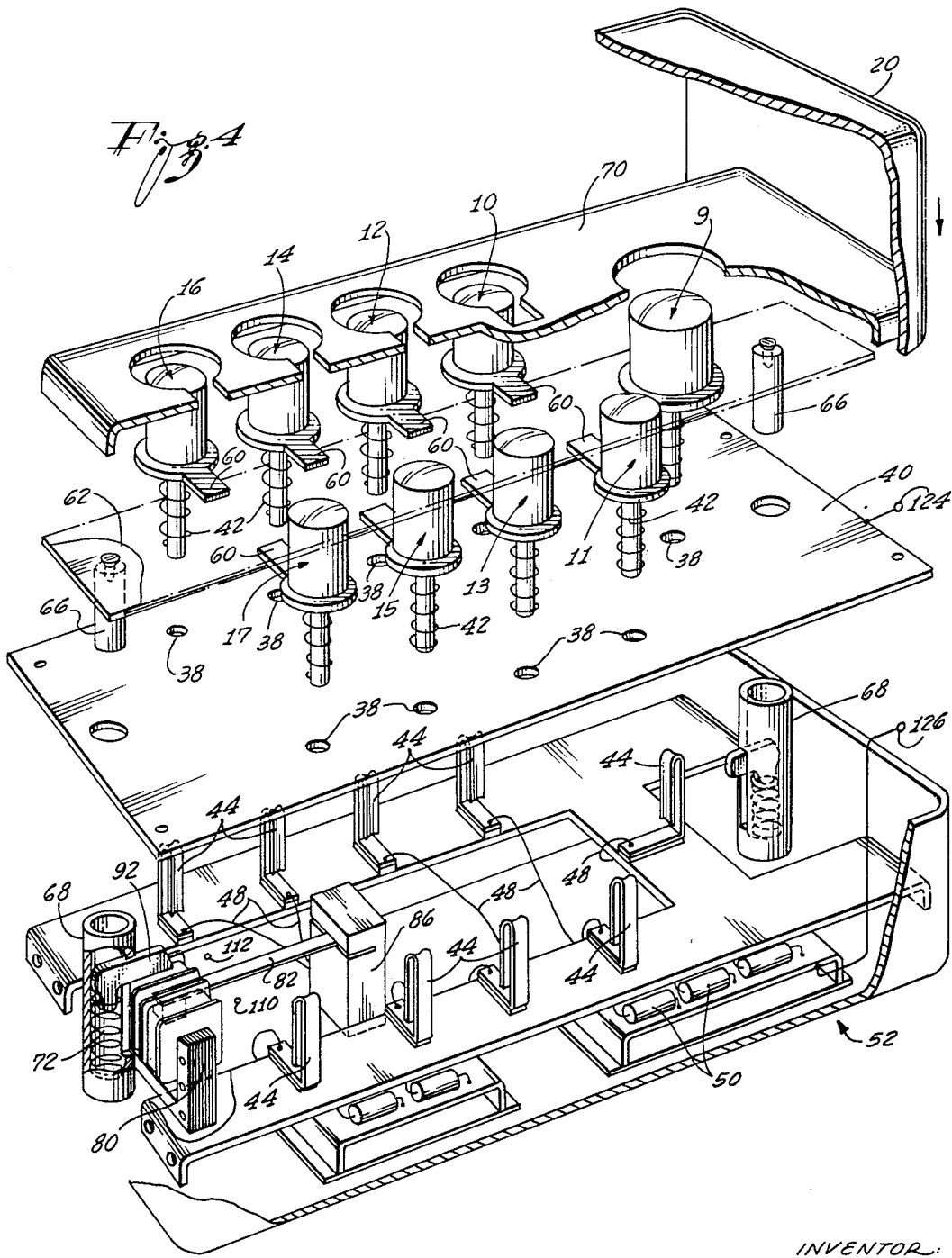
FIGURE 4 is an exploded perspective view of the remote controller of FIGURE 1.

Referring to FIGURE 1, the preferred embodiment of the instant invention shown there may be used as a remote control unit for television receiver sets or for any other machinery, electrical appliances or other devices where remote control is desirable. In any such application the purpose of the controller is to transmit a pulse of radio, optical, or acoustical energy across a relatively short distance to the device being controlled (not shown). This receiving device may illustratively be incorporated manner. This receiving device has electronic and electromechanical equipment whereby the pulses from the remote controller are to be utilized as signals to control some action that would otherwise have to be controlled manually, such as turning on and off a television set or changing the volume or the channel thereof, opening doors, operating a slide projector, or operating model airplanes and boats.

In the past, most of the small and inexpensive remote controllers developed for television use could transmit only one distinguishable type of pulse. The device being controlled than could only utilize the pulse to actuate a step switch or relay having progressive stations representing certain desired modes of operation of the device. For example, a two-station step switch might represent the "open" and "close" commands to a remotely controlled door. A multistation step switch might be useful for remote channel selection of a television set, but the switch could not also include volume control.

On the other hand, the remote controller of FIGURE 1 has sufficient manually-actuatable buttons (9 through 17) to give full remote control of a television set, due to the fact that actuation of each button results in a different frequency of pulse being transmitted to the receiver set in a manner to be explained in connection with FIGURE 7. Thus actuation of the button 9 will produce a pulse for energizing the channel selection step switch, as was done with prior remote controllers. In addition, the buttons 10 and 11 produce distinct pulses for "on-off" control of the television receiver. The buttons 12 and 13 produce additional distinct pulses for increasing or decreasing volume of the television receiver by actuation of a volume step switch. Similarly, the button pairs 14–15 and 16–17 may serve to rotate in opposite directions two step switches in the television receiver set which would serve the same function as the manually-actuated horizontal and vertical controls on the front panel of most present-day television receivers.

The remote controller of FIGURE 1 has a base structure 18 and a cover 20. The cover 20 has a top 22 through which the buttons 9–17 protrude and at least one side panel 24 having one or more outlets 26 through which an antenna 28 of the transmitter of FIGURE 1 may transmit, if it is desired to use an antenna. Many television remote controllers manage without an antenna. A remote controller built according to the preferred design shown in FIGURE 1 should be of about hand size and should weigh no more than one to two pounds.

Referring to FIGURES 2, 3 and 4, it will be seen that each of the buttons 9–17 has a body 30, a top 32 at the top of the body 30 and an upward travel limit flange 34 at the bottom of the body 30. A shaft 36 coaxial with the central axis of the body 30 extends down beneath the flange 34 through a bearing 38 on a bearing plate 40. Each of the buttons 9–17 has a coil spring 42 mounted coaxially with the shaft 36 and of such length and strength as to exert a force between the bearing plate 40 and the flange 34 to urge the button 30 upward. Beneath each shaft 36 is an electrical bus 44 mounted on the bus plate 46 which is affixed to the main support structure 18 of the remote controller. Each bus plate 44 is electrically connected by a lead 48 to one plate of a capacitor 50 mounted in an electronics area 52 at the bottom of the remote controller. The other plates of such capacitor 50 may be directly connected to a first terminal of the circuit to be described in connection with FIGURE 7.

It can be seen that manual depression of one of the buttons 9–17 will bring its shaft 36 into contact with the electrical bus 44. A conduction path through the shaft 36 ends at a second terminal of the circuit of FIGURE 7, resulting in the connection of one of the capacitors 50 into the time-constant determining portion of the oscillator circuit to be described in connection with FIGURE 7. Thus, each one of the buttons 9–17 has the capability of causing the oscillator circuit to produce radio waves of a different frequency, determined by the different values of the capacitors 50 associated with each button 9–17. In addition to this selection function, the depression of any one of the buttons 9–17 also simultaneously performs an electrical power generation function, to be described below.

Each of the buttons 9–17 has on its flange 34 a power generation ear 60 which is intended to contact a generator actuation bar 62 whenever any one of the buttons 9–17 is depressed. The generator actuation bar 62 is mounted on two shafts 64 and 66 which ride in cylinder 68 mounted on the structure 18 and are urged upward against the top portion 70 of the structure 18 by springs 72 within the cylinder 68. The mounting of the generator actuation bar 62 on the shafts 64 and 66 riding in the cylinders 68 is intended to ensure that the bar 62 will always remain perpendicular to the shafts 36, regardless of which of the buttons 9–17 applies a force thereto.

As explained in greater detail in the above-cited application, Ser. No. 337,582, the manually-actuatable generator for substitution in place of batteries in remote controllers and other short-pulse devices includes a first or stationary magnetic core 80 and a second movable magnetic core 82, which fits into an air gap of the stationary core 80. The movable magnetic core 82 is mounted on a leaf spring 84 which is affixed to a support 86 mounted directly to the structure 18 of the remote controller. A winding 88 around the core 80 serves to develop an electrical current whenever the amount of flux in the core 80 is changed by oscillation of the movable core 82. According to one feature of the instant invention, this oscillation may be set up by a ratchet 90 mounted between the shafts 64 and the spring 72 and having a contact arm 92 protruding from a slot 94 in the cylinder 68. If the ratchet 90 is mounted loosely between the shaft 64 and the spring 72, then when it is being pushed downward by the shaft 64 and is exerting force on the free end of the spring 84 it will remain perpendicular to the shaft 64 because of the flatness of the contact face 96 between the shaft 64 and the ratchet 90. On the other hand, when the shaft 64 is no longer being depressed and the spring 72 is pushing the ratchet 90 upward, the ratchet 90 will be able to bend downward against the spring when repassing the free end of the leaf spring spring 84 in the upward direction.

Figure 7:
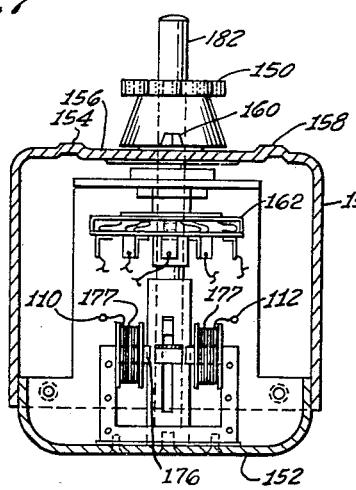
FIGURE 7 is a front elevation in cutaway of the remote controller of FIGURE 4.
Figure 8:
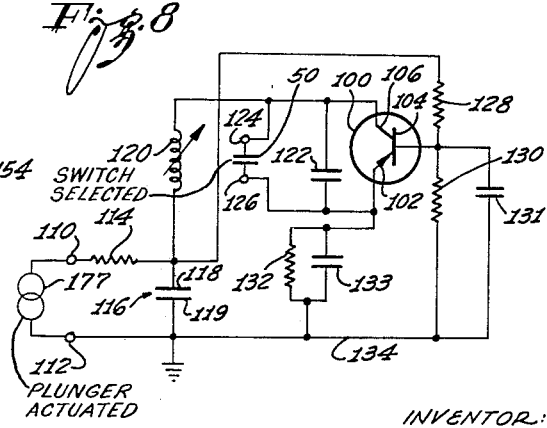
FIGURE 8 is a schematic diagram of a preferred oscillator circuit for a television remote control or other electrical signal generation according to the principles of the instant invention.

Referring to FIGURE 7, a typical radio-frequency oscillator for utilizing the electrical pulses generated in the coil 88 to produce control signals for a television receiver (not shown) would be centered about a transistor 100 having an emitter 102, base 104 and collector 106. This oscillator is similar to that described in connection with FIGURE 2 of the above-cited application, Ser. No. 337,-582. As stated in connection with that oscillator, the type of communication pulses generated might well be other than radio waves or electromagnetic signals . . . for example, acoustical signals or bursts of transmitted light. The input terminals 110 and 112 correspond to the output terminals of the winding 88 on the permanent core 80 of the generator portion of the remote controller of FIGURES 1–3. When any one of the buttons 9–17 is depressed so that the downward travel of one of the ears pushes down the generator actuator bar 62 to cause the ratchet 90 to depress the free end of the spring 84 and set up a temporary oscillation of the movable core 82 through the air gap of the fixed core 80, the resultant electrical current set up in the winding 88 will flow through the circuit of FIGURE 7.

At the input terminals 110, 112 of the circuit of FIGURE 7 appear a series resistor 114 and a parallel capacitor 116. The function of the resistor 14 is to limit the current surges that flow through the circuit in order to protect the components thereof, and the function of the capacitor 116 is to store charge appearing across the terminals 110, 112 to provide a smooth effect upon the oscillatory power, current and voltage wave forms produced by the generator shown in FIGURES 2 and 3. A first plate 118 and a second plate 119 are really, therefore, the sources of power "seen" by the transistor 100 and the other elements of the oscillator of FIGURE 7.

The output of the oscillator of FIGURE 7 is the radio wave energy radiated by the coil 120 coupled between the plate 118 and the collector 106. The frequency of these radio waves will be determined not only by the inductance of the coil 120 but also by the value of the capacitances connected between the collector 106 and the input terminal 112.

The frequency-determining capacitances in the oscillator of FIGURE 7 are connected between the emitter 102 and the collector 106, and during transmission will include a fixed capacitance 122 in parallel with whichever one of the capacitors 50 is switched into a coupling across two terminals 124 and 126, coupled to the collector 106 and emitter 102, respectively. The terminal 124 is electrically connected to the bearing plate 40, which is of a conductive material. Thus, contact of one of the shafts 36 with its bus 44 will couple one plate of the selected capacitor 50 to the collector 106. The other plates of all the capacitors 50 may be directly connected to the terminal 102, so that depression of one of the switches 9–17 is all that is necessary to complete the circuit connecting the transistor 100 in parallel therewith.

The transistor 100 has voltage-dividing resistors 128 and 130 connected in series between the plate 118 and the terminal 112, with the base 104 coupled therebetween, while another biasing resistor 132 couples the emitter 102 with the terminal 112. AC shunt capacitors 131 and 133 in parallel with the resistors 130 and 132, respectively, ensure that biasing is not affected by the higher frequencies present in the circuit.

In other words, the operation of the hand-actuated remote controller of FIGURES 1–3 is such that when the second core member 82 is in the air gap left in the first core 80, its pole faces will be positioned immediately adjacent to the faces on the opposite ends of the first core member 80. Substantially all of the magnetic lines of flux will then pass through both core members and maximum flux density will be maintained in the magnetic circuit formed thereby. However, when the spring 84 is deflected so as to move the second core member 82 out of the air gap, the spacing between the mating faces of the core members will be greatly increased. This will drastically increase the reluctance of the overall magnetic circuit whereby the flux density will be greatly reduced.

To sense the aforementioned variations in the flux density, the coil 88 may be provided anywhere, as long as it is around at least a portion of the magnetic circuit so as to encompass substantially all of the lines of flux in the field. In this present instance, this coil 88 is wound so as to be positioned upon the ends of the first core member 80. It should be noted that this coil 88 may be positioned at any desired location and if desired may actually include a plurality of coils. When the density of the flux within the magnetic core member 80 varies, the changes in the flux field will be sensed by the coil 88. The coil 88 will thus generate a corresponding voltage. The opposite ends of the coil 88 provide a voltage across the pair of electrical leads 110 and 112 so that these leads will have a voltage therebetween that corresponds to the voltage developed within the coil 88.

It may thus be seen that as the spring 84 vibrates, the core member 82 will move through the air gap in the core 80. The density of the flux field maintained by the permanent magnetizing of the core member 80 will then vary. The voltage generated within the coil 88 and present between the two leads 110 and 112 will be an alternating voltage having a frequency determined by the frequency of the oscillating magnetic field. This frequency will, in turn, be determined by the rate at which the spring 88 vibrates.

The two leads 110 and 112 from the coil 88 are interconnected with the input to the transmitter of FIGURE 7. The transmitter of FIGURE 7 is capable of radiating signals of the electromagnetic variety from its coil 120. In the present instance, the transmitter is a transistorized oscillator having only the single transistor 100, but many other designs could be used. The base 104 is connected to what is essentially a ground 134 by means of resistor 130 and condenser 131 that are disposed in parallel to each other. The emitter 102 is also connected to the ground line 134 by means of the resistor 132 and condenser 133 that are disposed in parallel with each other. The collector 106 is connected to ground line 134 by means of an inductance 120 and a condenser 116.

The condensers 50 and 122 may interconnect the collector 106 and the emitter 102 to form a feedback circuit. Because of this feedback, the circuit will be capable of oscillating at some predetermined frequency determined by the various components in the circuit. It may be appreciated that when this oscillator is running, an appreciable amount of energy will be radiated from the inductance 120 whereby a receiver in the vicinity will be capable of receiving this energy. Normally the transmitter of FIGURE 7 is intended to transmit command signals over a relatively short distance. However, if desired the oscillator may be coupled to an antenna such as those at 28 for radiating more of the energy over a longer range.

The inductance 120 and condenser 50 may be made variable through some predetermined range so that the natural resonant frequency of the oscillator may be tuned to some particular frequency. Normally this frequency will be in a region extending up to a few kilocycles, for example 35 to 50 kc. s.

The electrical leads 110 and 112 from the coil 52 may be interconnected with the ground line 134 and the opposite side of the condenser 116. It may be appreciated that the potential at the junction 118 between the condenser 116 and the inductance 76 will be determined by the voltage generated in the coil 88. The junction 118 may be connected with the base 104 by means of the resistor 128. The base 104 will thus be at a voltage that is a function of the amplitude of the voltage generated in the coil 88. However, it will be reduced from this level by the voltage dividing action of the resistor 130 and the resistor 128.

In the event that it is desired to remotely control a function, such as the adjustment of a television receiver, the operator may depress one of the buttons 9–17, causing one of the capacitors 50 to be connected across the terminals 124 and 126 and simultaneously causing the ratchet 90 to push down the free end of the spring 84 and then release it. The free end will then vibrate and carry the core member 82 through the air gap of the member 80. As this vibratory motion of the spring 84 and the core member 82 occurs, the size of the effective air gap of the magnetic circuit 80–82 will vary. This in turn will cause the density of the flux within the magnetic circuit 80–82 to vary. As the flux varies, the coil 88 will be energized and generate a voltage.

The magnitude of the voltage developed between the two leads 110 and 112 will be a function of the rate at which the core member 82 moves through the air gap of the member 80. Also, the frequency of the voltage will be determined by the frequency at which the spring 84 vibrates. The voltage will be generated only as long as the spring 84 continues to vibrate which, of course, will be determined by the various parameters of the power generator.

By way of example, in one operative power generator the voltage developed during the initial portions of the vibrations was on the order of 5 to 6 volts. Although the voltage immediately decreases in an exponential manner, it is possible to obtain a power on the order of 1 watt for a period of about ½ second. If the particular application requires more power for a longer period of time the strength of the spring 84, the flux field, etc., may be increased. It may be seen that although the present power supply is shown as being used to drive the transmitter of FIGURE 7, it may be used to energize any remote control transmitter having requirements of the type described above.

When the spring 84 vibrates, the voltage developed in the coil 88 will be carried across the two leads 110 and 112 and applied to the opposite sides of the condenser 116. The voltage present at the junction 118 will be applied across the two resistors 128 and 130. These resistors 128 and 130 will then act as a voltage divider and apply a predetermined part of the potential to the base 104 of the transistor 100. In addition, the voltage from the junction 118 will be coupled through the coil 120 to the collector 106. As a consequence, the transmitter of FIGURE 7 will be energized so as to oscillate at its own natural resonant frequency as determined by the settings of the coil 120 and values of the condensers 50.

The amplitude of the oscillation will in part be determined by the voltage at the junction 118. Since the amplitude of the voltage from the coil 88 is fluctuating at the frequency of the spring 84, the potential at the junction 118 will also be varying. As a consequence, the amplitude of the oscillations will fluctuate whereby they will be amplitude-modulated at the same frequency as the spring 84.

The winding 120 will be effective to radiate the energy of these oscillations in the form of an amplitude-modulated carrier wave. The carrier will have a frequency equal to the resonant frequency of the oscillator. The amplitude modulation will have a frequency which corresponds to the frequency of the spring 84. The radiated command signals will be received by a remote control receiver on the television receiver to be controlled. When it receives a command signal it will make an adjustment to the receiver. A series of band-pass filters in the receiver corresponding to the capacitors 50 associated with each button 9–17 ensure that each distinct frequency of control pulse will trigger a change at only one point in the television set to be controlled.

Figure 5:
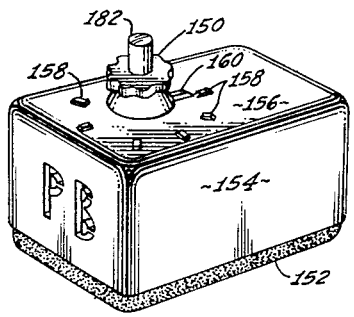
FIGURE 5 is a perspective view of another television set remote control unit built according to the principles of the instant invention.
Figure 6:
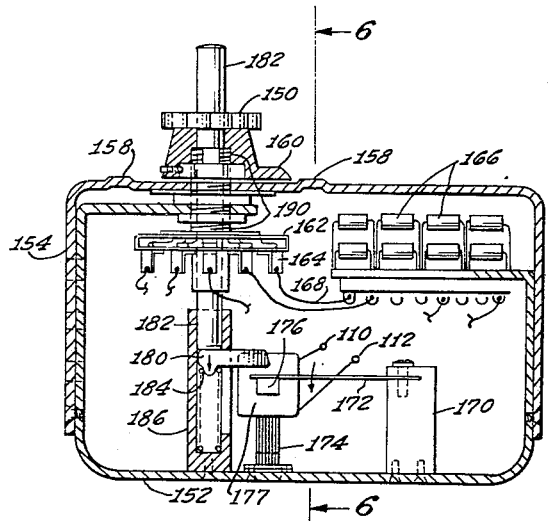
FIGURE 6 is a side elevation in cutaway of the remote controller of FIGURE 4.

Referring to FIGURES 5–7, a second preferred embodiment of the principles of the instant invention performs the selection function with a rotatable knob 150 rather than using a bank of buttons, such as those shown at 9–17 of FIGURES 1–4. A remote controller according to the second embodiment has a support structure 152 and a cover 154. Since in the television area a remote controller is usually used in a darkened room where the position of the selector knob 150 cannot be ascertained visually, a top panel 156 of the remote controller has raised or other tactically-sensible indicators 158 and has a pointer 160 on the knob 150 in order too permit users of the remote controller to determine which command signal is to be broadcast without turning on the lights in the room. Referring to FIGURES 5 and 6 which show the interior of the rotary knob remote controller, it will be seen that rotation of the knob 150 rotates a wafer 162 bearing electrical contacts 164 which are coupled to capacitors 166 which perform a function similar to that performed by the capacitors 50 referred to above in the circuit of FIGURE 7. That is to say, the capacitors 166 are selectively coupled between the terminals 124 and 126 to vary the time constant of the oscillator of FIGURE 7 so that the frequency of the command pulses transmitted thereby is varied. Each of the capacitors 166 is connected by a lead 168 to one of the contacts 164.

The manually-operated generator portion of the remote controller of FIGURES 4–6 is almost identical to that discussed in connection with FIGURES 1–3. It has a support 170 mounted to the main structure 152 of the remote controller and has a spring 172 mounted on the support. A first core member 174 is mounted directly on the structure 152 and is the stationary member 80 in connection with FIGURES 1–3. A second core member 176 is mounted at the free end of the spring 172 and corresponds to the oscillatory core member 82 discussed in connection with FIGURES 1–3. Oscillation of the spring 172 is set up by a pawl 180, similar to the pawl 90 discussed above. The pawl 180 is mounted between a shaft 182 and a spring 184, both of which are confined in a cylinder 186, such as discussed above. In the specific illustration set forth in FIGURES 4–6 the shaft 182 is made coaxial with the knob 150 and passes through the knob to emerge above the top thereof. In this arrangement, once the knob 150 is set to the proper indicator 158 the operator of the remote controller merely depresses the shaft 182. It can be seen that the shaft 182 need not be coaxial with the knob 150 and in another design could be removably affixed to the knob 150 so that depression of the entire knob was necessary to cause the pawl 180 to deflect the spring 172 while at the same time rotation of the knob 150 would select the proper command to be sent.

Thus, it is another accomplishment of the invention that the above-mentioned power generation and selection functions of application, Ser. No. 337,582 may be performed by using one knob, by the provision of simple mechanical linkage whereby rotating the knob 150 performs the selection function and depressing the knob 150 or the shaft 182 performs generation function. The preferred embodiment of this principle shown in FIGURES 4–6 has two control shafts 182 and 190, the latter rotatable and the former depressible. The knob 150 is mounted on the outer rotatable shaft 192 and the wafer 162 is mounted on the shaft 190 to rotate therewith (or, in the alternative, mounted coaxially with the shaft); and the arrangement of the electrical contacts 164 is such whereby rotation of the wafer 162 will cause a different capacitor 166 to be thrown into circuit with the RF oscillator of FIGURE 7. The use of this preferred embodiment would be that the shaft 190 would be rotated to switch in the proper capacitor 166 and then the shaft 182 is depressed to oscillate the power generation spring 172. The knob 150 on the control shaft 190 should always be so shaped as to give an indication of the degree of rotation of the control shaft 190, so that the rotatable shaft embodiment of FIGURES 4–6 built in accordance with the principles of the instant invention will be usable regardless of room darkness.

As stated above, in the television remote control field a batteryless remote control system has been felt to have great sales potential, not only for itself, but also for the entire television set system with which it is associated. In the above-cited application, Ser. No. 337,582, the usual need for batteries was avoided by the use of a manually-actuated power generator. This power generator included a magnetic circuit having a first core member and a second core member, one of which was permanently magnetized and one of which had a coil wound around it. The first core member had an air gap into which the second core member was able to fit with a minimum clearance on either side, and the second core member was then mounted on a spring in such position that it would pass through this air gap and thus generate a current in the coil if oscillatory motion was somehow initiated in the spring. It can be seen how this principle has been imported into the multiple-command type remote controllers shown in FIGURES 1–3 and FIGURES 4–6.

The preferred method of converting hand power into oscillatory motion of the spring disclosed in the above-cited application, Ser. No. 337,582, was to have the spring mounted in cantilever form and to deflect the free end of the spring with some hand-rotatable pointed device, of which a ratchet wheel would be a good example. In the instant invention, a deflectable, rather than rotatable, spring-actuated motion is desired, so that the ratchet 90 and generator bar 62 arrangement is provided. In this way, selection motion of any one of the buttons 9–17 will automatically oscillate the spring 84.

It is, therefore, the accomplishment of the instant invention to extend the power generation principle of application, Ser. No. 337,582, to apply it to a radio wave wave transmitter-generator such as is found in the television remote control field wherein a half dozen or more different frequencies of burst are transmitted in order to improve the capabilities of the remote controller beyond that of mere single-command step-switch performance. Another accomplishment of the invention is to provide such a variable-command frequency remote controller wherein the highest degree of ease of use and convenience are achieved in order to enhance the salability of the controller and of the television set with which it is associated.

In the achievement of the above and other desiderata and as a feature of applicant's invention, there is provided the remote control type of radio transmitter of FIGURES 1–3 wherein a single manual act, such as depressing one of the buttons 9–17, serves both to switch a certain desired capacitor 50 into the time-constant circuitry of the oscillator of FIGURE 7 which generates the radio waves and to deflect the power generator spring 84 to cause the second core member 82 to oscillate through the first core member 80 and thereby to supply power to the radio signal (RF) oscillator of FIGURE 7.

As another feature of the invention, the abovedisclosed simultaneous frequency selection and power generation can be achieved by providing a bank of buttons 9–17, each of which corresponds to a different frequency. The actuation of any single one of these buttons 9–17 then causes a deflection force to be applied at the end of the power generator spring 84, while simultaneously whichever capacitor 50 corresponds to the desired command frequency is switched into the time-constant circuitry of the RF oscillator (i.e., across the terminals 124 and 126).

In summary, then, this invention sets forth principles which make improvements upon the power generator disclosed in the United States patent application, Ser. No. 337,582, in order to extend the important advance of that application to the multi-command remote controller area, whether for television or for industrial and hobby equipment control. As stated previously, the above cited application, 337,582 featured principles for the elimination of batteries in electrical equipment wherein only short bursts of energy are required, because battery-powered equipment has never been fully satisfactory and has never had strong sales value due to the limited power delivery capabilities and short life of the average dry cell. The elimination of batteries was accomplished by generating power in short bursts by manually varying the flux path of a magnetic circuit around which a coil was wound. In the television remote control field such batteryless remote control system has been felt to have great sales potential, both for itself and (more importantly) for the entire television set system with which it is associated.

In the embodiments of FIGURES 1–3 and of FIGURES 4–6, as in the above-cited application, Ser. No. 337,582, the usual need for batteries is avoided by the use of a manually-actuated power generator. This power generator includes a magnetic circuit having a first core member (80, 174) and a second core member (82, 176). The first core member is magnetized and has an air gap into which the second core member is able to fit with a minimum clearance on either side, and one of the core members should have (1) an induced magnetism (preferably, permanent) and (2) a coil (88, 177) in which current is induced when the magnetism is varied. The second core member is then mounted on a spring (84, 172) in such position that it would pass through this gap if oscillatory motion was somehow initiated in the spring. The preferred method of converting hand power into oscillatory motion of the spring disclosed in the above-cited application was to have the spring mounted in cantilever form and to deflect the free end of the spring with a hand-rotatable ratchet wheel, but in the instant invention the pawl (90, 180) is preferred because both embodiments herein (FIGURES 1–3 and FIGURES 4–6) deal in linear, not rotary, motion.

It is the accomplishment of the instant invention to therefore extend the power generation principle of application, Ser. No. 337,582 to apply to radio wave transmitter-generators, such as are found in the television remote control field wherein a half dozen or more different frequencies of burst are transmitted in order to improve the command capabilities of the remote controller beyond that of mere single-pulse performance. Also, the invention provides such variable frequency remote controllers wherein maximal ease of use and convenience are achieved and cheap manufacture and maintenance are assured, in pursuit of the ultimate objective of greater salability of the controller and of the television set with which it is associated.

Thus, as a feature of applicant's invention there is provided in general a remote control type of radio transmitter wherein a single manual act, such as depressing a button (9–17) or shaft (182) can serve both to generate power and to switch a certain desired impedance, such as a resistor, capacitor or inductor, into the time-constant circuitry of an oscillator (such as that of FIGURE 7) which generates the radio command pulses transmitted to the receiver of the device to be controlled. Either a tab, such as that at 60, or a direct shaft, such as 182, deflects the power generator spring (84, 172) to cause the second core member (92, 176) to oscillate through the first core member (80, 174) and thereby to supply power to the oscillator of FIGURE 7.

As another feature of the invention, the above-disclosed simultaneous frequency selection and power generation is achieved in one embodiment providing the bank of buttons 9–17 (or any other manually-actuatable elements), each of which corresponds to a different frequency. The actuation of any single one of these buttons 9–17 then causes a deflection force to be applied at the end of the power generator spring 84 through the ear 60, actuation bar 62, shaft 64 and pawl 90, while simultaneously a capacitor 50 or other impedance device corresponding to the desired frequency is switched into the time-constant circuitry at 124 and 126 of the RF oscillator of FIGURE 7.

As another feature of the invention, the above-mentioned power generation and selection functions may be performed using the knob 150 and shaft 182, whereby rotating the knob 150 performs the selection function and depending the shaft 182 performs the generation function. Although the rotatable shaft 190 and depressible shaft 182 are here shown separate for purposes of illustration, a preferred embodiment of this rotary-selection principle would have a control shaft which is both rotatable and depressible, a knob mounted on the shaft, a wafer mounted on the shaft to rotate therewith (or, in the alternative, mounted coaxial with the shaft), and an arrangement of electrical contacts whereby rotation of the wafer will cause different impedances to be thrown into circuit with the RF oscillator. The use of this preferred embodiment would be that the same shaft would first be rotate to switch in the proper impedance and then depressed to oscillate the power generation spring.

It is a subsidiary feature of applicant's invention that the knob 150 on the control shaft 190 is so shaped as to give an indication of the degree of rotation of the control shaft 190, so that the rotatable shaft versions of television remote controllers built in accordance with the principles of the instant invention will be usable in the low light customarily maintained for television viewing.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed. For example, inductance-type impedances can be used wherever capacitance-type impedances are discussed and shown in the preferred embodiment, although the latter are better.

I claim as my invention:

1. In combination for simultaneously generating a pulse of electrical energy and selecting a frequency for the radio transmission of energy,
   a magnetic circuit having a first core member forming an air gap and a second core member, said second core member being movable into and out of said air gap to complete said magnetic circuit and to vary the reluctance of the magnetic circuit,
   means for resiliently supporting the second core member in said air gap for oscillatory movement through the air gap,
   a source of magnetomotive force coupled to the magnetic circuit to maintain a flux field that circulates through said first core member and across said air gap, said flux field having a flux density that is a function of the position of the second core member in the air gap,
   coil means wound upon at least one of said core members to encompass at least a portion of the flux field, said coil means being responsive to changes in the flux in said circuit so as to generate power in response to the movement of the second core member through the air gap,
   transmitting circuitry electrically connected to be operated by the power generated by the coil means,
   a plurality of impedances,
   manually-operable means for alternatively selectively switching one of said impedances into the transmitting circuitry to vary the frequency of the signal broadcast thereby, and
   movable means for initiating an oscillatory movement of the second core member through the air gap to produce power for the transmitting circuitry said movable means being coupled to said manually operable means.

2. In combination for producing bursts of radio waves at variable frequencies,
   a first core member having an air gap, said first member being permanently magnetized so as to maintain a flux field across the air gap,
   a second core member movable into and out of said air gap to complete a magnetic circuit that includes the first and second members, said second member having a high permeability so as to vary the reluctance of the magnetic circuit as it moves into and out of the air gap,
   resilient spring means secured to the second core member for resiliently supporting the second core member in said air gap for oscillatory movement through the air gap,
   coil means wound about at least one of said core members to encompass at least a portion of the flux field in the magnetic circuit, said coil means being responsive to changes in the flux density in said circuit so as to generate a voltage in response to the movement of the second core member through the air gap,
   manually-operated means for initiating oscillatory movement of the resilient spring means and oscillatory movement of the second core member through the air gap, said manually-operated means including a rotatable knob and a shaft concentric with the knob which shaft is movable in an axial direction to initiate said oscillatory movement,
   transmitter means for utilizing the voltage across the coil to produce signal waves, and
   a plurality of switchable impedances having individual values and operatively associated with the knob to become selected by rotation of the above-mentioned knob for electrical connection into the transmitter means upon movement of the knob to vary the frequency of the signal waves in accordance with the individual values of the selected impedances.

3. The combination set forth in claim 2 wherein the knob is individually shaped to provide for a sensing of its rotation by feel rather than by vision.

4. In combination for generating electrical signals of selectably variable frequency,
   an oscillator circuit for producing AC electrical signals,
   a time-constant network in the oscillator circuit for determining the frequency of the AC electrical signals,
   means positioned in the time-constant network and providing an electrical impedance and having first and second terminals to vary the frequency of the electrical signals generated by the oscillator circuit in accordance with the value of the impedance connected between the first and second terminals,
   a plurality of capacitors of values such that electrical connection of each one of said capacitors between the first and second terminals will cause the time-constant network to provide a certain desired frequency of the AC electrical signals generated by the oscillator circuit,
   switching means for selectably connecting one of the capacitors between the first and second terminals in the time-constant network,
   a support,
   a magnetic circuit having a first core member secured to the support and having a second core member, the first core member forming an air gap and the second core member being movable into and out of the air gap to vary the reluctance of the circuit as a function of the volume of the second core member in the air gap,
   means for providing a magnetomotive force to maintain a flux field in the first and second core members, said flux field extending across the air gap and through the portion of the said core member in the air gap, said flux field having a density that is a function of the position of the second core member relative to the air gap,
   spring means secured to said support with a portion of the spring means positioned adjacent the air gap, the second core member being secured to the spring means for oscillatory movement into and out of the air gap to thereby vary the density of the magnetic flux field, coil means on at least one of said core members to encompass at least a portion of the flux field in the magnetic circuit, said coil means being effective to generate a voltage in response to the movement of the second core member through the air gap, and means for simultaneously actuating said switching means to connect individual ones of the capacitors between the first and second terminals and for creating oscillatory movement of the second core member.

5. In combination:

a shaft, a plurality of capacitors having individual characteristics, a plurality of contacts respectively connected to the different capacitors in the plurality, at least one brush disposed for rotation about the axis of the shaft to make selected electrical connection with at least one of the contacts, a transmission system constructed to include individual ones of said capacitors as selected by rotation of said brush until the repective contact makes connection with the brush and to transmit signals of variable frequency characteristics in accordance with the individual characteristics of the capacitor selected, said signals being variable in frequency depending upon which of the capacitors has been included in the transmission system by rotation of the selector means, a power generator electrically connected to supply power for operating the transmission system, and mean mechanically connected between the shaft and the power generator and responsive to a movement of the shaft in a direction coaxial with the axis of rotation of the brush to cause the power generator to supply power to the transmission system to obtain the production of signals by the transmission system.

6. In combination for generating electrical signals of selectably variable frequency, an oscillator circuit for producing AC electrical signals, a time-constant network in the oscillator circuit for determining the frequency of the AC electrical signals, means positioned in the time-constant network and providing an electrical impedance and having first and second terminals to very the frequency of the electrical signals generated by the oscillator circuit in accordance with the value of the impedance connected between the first and second terminals, a plurality of capacitors having individual values such that electrical connection of each of said capacitors between the first and second terminals will cause the time-constant network to provide a certain desired frequency of the AC electrical signals generated by the oscillator circuit, a first shaft, a second shaft coaxial with the first shaft, at least one brush mounted on the second shaft and disposed to make electrical connection with the individual capacitors in the plurality as the second shaft rotates, a support, a magnetic circuit having a first core member secured to the support and having a second core member, the first core member forming an air gap and the second core member being movable into and out of the air gap to vary the reluctance of the circuit as a function of the volume of the second core member in the air gap, spring means secured to said support with a portion of the spring means positioned adjacent the air gap, the second core member being secured to the spring means for oscillatory movement into and out of the air gap to thereby vary the density of the magnetic flux field, coil means on at least one of said core members to encompass at least a portion of the flux field in the magnetic circuit, said coil means being effective to generate an alternating voltage in response to the movement of the second core member through the air gap, and the second shaft being coupled to the brush and rotatable for the selection of the individual capacitors, said first shaft being movable in the axial direction to restrain and then release the spring means for an oscillatory movement of the spring means and the generation of the alternating voltage for energizing said oscillator circuit.

7. The combination according to claim 6 with the addition of a knob on the second shaft, said knob having tactilly sensitive physical characteristics indicative of the angular position of the second shaft.

8. In combination:

manually-actuated rotary selector means, a plurality of impedance elements having individual values and associated with the rotary selector means to become selected from a rotation of the selector means to individual positions, a transmission system including individual ones of the impedance elements as selected by the selector means to transmit signals of variable characteristics, said signals being variable in their characteristics depending upon which of the impedance elements have been included in the transmission system by rotation of the selector means, a power generator electrically connected to supply power for operating the transmission system in accordance with the actuation of the power generator, and manually-operable means mechanically connected to the power generator said manually operable means being concentric within said rotary selector means and responsive to manual actuation in the axial direction to actuate the power generator for causing the power generator to supply power to the transmission system.

9. The combination set forth in claim 8 wherein the manually-actuated rotary selector means includes a knob and a shaft, the knob being rotated to obtain a selection of individual ones of the impedance elements in the plurality and wherein the power generator includes a magnetic circuit having an air gap and further includes a coil disposed in the magnetic circuit and electrically connected to the transmission system to obtain the production of signals by the transmission system in accordance with the production of signals in the coil and wherein the manually-operable means includes a spring operably coupled to the shaft for converting an axial movement of the shaft into an oscillatory movement of the leaf spring and wherein the leaf spring carries a magnetic member into and out oif the air gap in accordance with the oscillatory movement of the spring to obtain the production of the signals by the transmission system.

References Cited

UNITED STATES PATENTS 2,307,525   1/1943   Mallina.
3,056,932   10/1962   Wood _____ 325—185

THOMAS B. HABECKER, Primary Examiner

U.S. Cl. X.R.

331—71, 117, 185; 340—210, 365